United States Patent [19]
Kidd et al.

[11] 3,904,290
[45] Sept. 9, 1975

[54] OPTICAL SYSTEM ALIGNMENT APPARATUS

[75] Inventors: Wayne L. Kidd; Stephen C. Corona, both of Fairport, N.Y.

[73] Assignee: Xerox Corporation, Stamford, Conn.

[22] Filed: Feb. 4, 1974

[21] Appl. No.: 439,172

[52] U.S. Cl................................. 355/8; 356/172
[51] Int. Cl............................................ G03g 15/00
[58] Field of Search............................... 355/4, 8

[56] References Cited
UNITED STATES PATENTS

| | | | |
|---|---|---|---|
| 3,062,108 | 11/1962 | Mayo | 355/8 |
| 3,419,327 | 12/1968 | Oikawa | 355/8 |
| 3,439,983 | 4/1969 | Blow | 355/8 |

*Primary Examiner*—John M. Horan
*Attorney, Agent, or Firm*—H. Fleischer; C. A. Green; J. J. Ralabate

[57] ABSTRACT

An apparatus in which the alignment of an optical system is displayed, thereby enabling misalignments therein to be corrected. The alignment apparatus, in conjunction with the optical system, generates a narrow sample light image. This sample light image is displayed so as to depict the optical system misalignment. Thereafter, the optical system is adjusted and a corrected sample light image produced. The corrected sample light image is once again displayed to insure that the optical system is in alignment.

5 Claims, 4 Drawing Figures

PATENTED SEP 9 1975

3,904,290

OPTICAL SYSTEM ALIGNMENT APPARATUS

The foregoing abstract is neither intended to define the invention disclosed in the specification, nor is it intended to be limiting as to the scope of the invention in any way.

BACKGROUND OF THE INVENTION

This invention relates generally to an electrophotographic printing machine, and more particularly concerns an apparatus for aligning an optical system employed therein.

In the process of electrophotographic printing, a photoconductive surface is uniformly charged and exposed to a light image of an original document. Exposure of the photoconductive surface records thereon an electrostatic latent image of the original document. The electrostatic latent image is then rendered visible by depositing toner particles which adhere electrostatically thereto in image configuration. Subsequently, the toner powder image is transferred to a sheet of support material which may be plain paper or a sheet of transparent thermoplastic material, amongst others. The toner powder image is, then, permanently affixed to the support material. This provides a copy of the original document.

Electrophotographic printing machines frequently employ scanning optics. On occasion, the scanning system has demonstrated a tendency for the scan lamps and lens of the optical system to become misaligned relative to each other due to mechanical vibrations, cable stretching and slippage of the locking mechanism. Hereinbefore, this has had no major impact on copy quality due to the wide latitude of the electrophotographic printing system. However, with the advent of multi-color photographic printing, the system latitude is relatively small. Hence, the misalignment of the lens system and scan lamps produces a series of variations in sensitometry and the final output color copy quality.

Multi-color electrophotographic printing is substantially the same as the heretofore discussed process with the following distinctions. Rather then creating a total light image of the original document, the light image is filtered producing a single color light image which is a partial light image of the original document. The foregoing single color light image exposes the charged photoconductive surface recording thereon a single color electrostatic latent image. This single color latent image is developed with toner particles of a color complementary to the single color light image. Thereafter, the single color toner powder image is transferred to the support material. The foregoing process is repeated a plurality of cycles with differently colored light images and the respective complementarily colored toner particles. Each single color toner powder image is transferred to the support material in superimposed registration with the prior toner powder image, thereby forming a multi-layered powder image thereon. This multi-layered toner powder image is then heated so as to permanently affix it to the sheet of support material.

It is evident that in multi-color electrophotographic printing, misalignments in the optical system will be significantly magnified. One factor causing this is that successive toner powder images must be transferred in superimposed registration with one another to the support sheet. The registration of the toner powder images relative to one another is determined by the orientation of the electrostatic latent image, which, in turn, is dependent upon the alignment of the optical system. Hence, color electrophotographic printing systems employing a scanning optical system may have copy quality variations due to the misalignment of the scan lamps and lens systems.

Accordingly, it is a primay object of the present invention to improve the alignment of optical systems employed in electrophotographic printing machines to optimize system sensitometry and the resulting copy quality.

SUMMARY OF THE INVENTION

Briefly stated, and in accordance with the present invention, there is provided an apparatus for aligning an optical system.

This is achieved, in the present instance, by an alignment apparatus operatively associated with the optical system. The optical system includes an adjustable light source mounted on a movable frame member, and lens means arranged to create a light image from light rays transmitted thereto. During alignment, an alignment member is positioned in a light receiving relationship with the light rays transmitted from the light source. The alignment member is adapted to reflect a narrow band of sample light rays therefrom. These sample light rays pass through the lens means forming a narrow sample light image thereof. Means is provided for indicating the position of the narrow sample light image so as to determine the alignment of the optical system. This is accomplished by positioning the indicating means in a light receiving relationship with the narrow sample light image transmitted through the lens means.

BRIEF DESCRIPTION OF THE DRAWINGS

Other objects and advantages of the present invention will become apparent upon reading the following detailed description and upon reference to the drawings, in which.

While the present invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
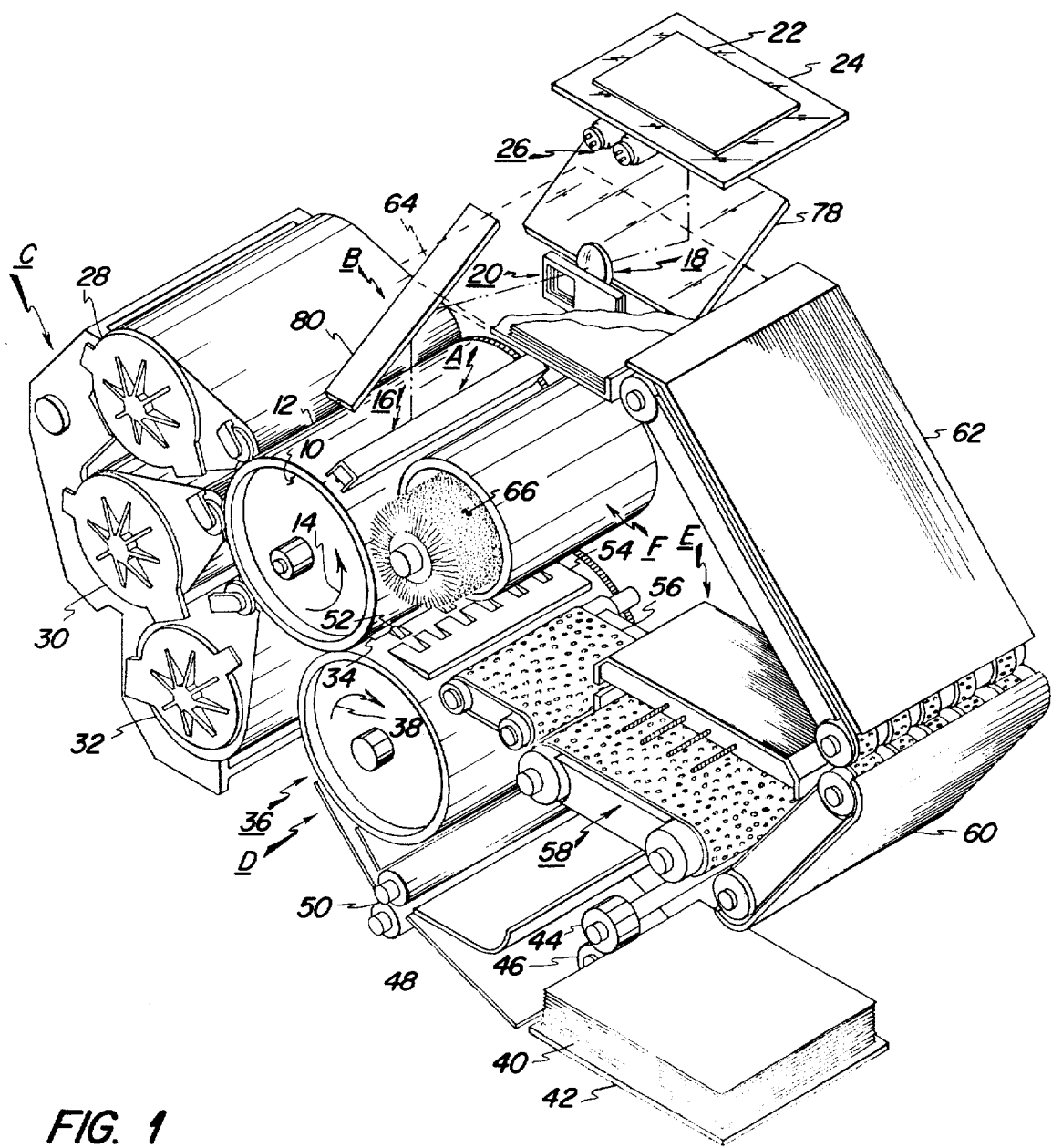
FIG. 1 is a schematic perspective view of a color electrophotographic printing machine employing the optical system being aligned therein.

For a general understanding of the disclosed multicolor electrophotographic machine in which the optical system being aligned may be incorporated, continued reference is had to the drawings. In the drawings, like reference numerals have been used throughout to designate like elements. Initially, a general description of the electrophotographic printing machine will be provided. Thereafter, the detailed alignment procedure and apparatus associated therewith will be discussed. With the foregoing kept in mind, FIG. 1 schematically illustrates the various components of a printing machine for producing color copies from a colored original document. Although the alignment procedure and apparatus associated therewith is particularly well adapted for use in an electrophotographic printing machine, it should become evident from the following discussion that is equally well suited for use in a wide variety of optical systems and is not necessarily limited in its application to the particular embodiment shown herein.

As shown in FIG. 1, the electrophotographic printing machine includes rotatably mounted drum 10 having a photoconductive surface 12 secured to and entrained about the exterior circumferential surface thereof. Drum 10 is mounted on a shaft in the printing machine and rotates in the direction of arrow 14. This causes photoconductive surface 12 to pass sequentially through a series of processing stations. One type of suitable photoconductive material is disclosed in U.S. Pat. No. 3,655,377 issued to Sechak in 1972. Drum 10 rotates at a predetermined speed relative to the other machine operating mechanisms. The various machine operations are coordinated with one another by a timing disc mounted on the shaft of drum 10 and arranged to rotate in conjunction therewith. The timing disc develops a series of electrical signals arranged to produce the proper sequence of events at the appropriate processing stations.

Initially, drum 10 rotates photoconductive surface 12 through charging station A. Charging station A has positioned thereat a corona generating device indicated generally at 16. Corona generating device 16 extends in a generally transverse direction substantially across photoconductive surface 12. This readily enables corona generating device 16 to charge photoconductive surface 12 to a relatively high substantially uniform potential. Preferably, corona generating device 16 is of a type described in U.S. Pat. No. 2,778,946 issued to Mayo in 1957.

After drum 10 is charged to a substantially uniform potential, it rotates to exposure station B. At exposure station B, the charged photoconductive surface is exposed to a color filtered light image of the original document. Exposure station B includes thereat a moving lens system, generally designated by the reference numeral 18, and a color filter mechanism shown generally at 20. A suitable moving lens system is described in U.S. Pat. No. 3,062,108 issued to Mayo in 1962. Similarly, a suitable color filter mechanism is described in U.S. Pat. No. 3,775,006 issued to Hartman in 1973. With continued reference to FIG. 1, an original document 22, such as a sheet of paper, book or the like is positioned face down upon transparent viewing platen 24. Lamp assembly 26 and lens 18 are moved in a timed relation with respect to drum 10 to scan successive incremental areas of original document 22. In this manner, a flowing light image of original document 22 is projected onto charge photoconductive surface 12. Filter mechanism 20 is adapted to interpose selected color filters into the optical light path. The appropriate color filter operates on the light image therefrom. The single color light image discharges selected regions of photoconductive surface 12 to record thereon an electrostatic latent image corresponding to a preselected spectral region of the electromagnetic wave spectrum. Hereinafter, this electrostatic latent image will be referred to as a single color electrostatic latent image. The alignment of the optical system is critical in producing successive single color electrostatic latent images having the requisite color balance, image registration and intensity relative to one another. The foregoing is particularly significant in the case of color electrophotographic printing machines wherein successive single color electrostatic latent images are recorded on the photoconductive drum. These successive latent images are developed and transferred, in registration with one another, to a sheet of support material. Misalignments in the optical system may degrade the resultant copy produced thereby. Hence, the present invention is directed to an apparatus and method associated therewith for aligning the optical system. The detailed optical alignment procedure and apparatus will be described hereinafter with reference to FIGS. 2 through 4, inclusive. Proceeding now with the description of the electrophotographic printing machine, after the single color electrostatic latent image is recorded on photoconductive surface 12, drum 10 rotates to development station C.

Development station C includes thereat three individual developer units, generally indicated by the reference numerals 28, 30 and 32, respectively. A suitable development station employing a plurality of developer units is disclosed in co-pending application Ser. No. 255,259 filed in 1972. Preferably, the developer units are all of a type generally referred to as magnetic brush developer units. Typical magnetic brush developer units employ a magnetizable developer mix having carrier granules and toner particles therein. This developer mix is continually brought through a directional flux field to form a brush thereof. The single color electrostatic latent image recorder on photoconductive surface 12 is developed by bringing the brush of developer mix into contact therewith. Each of the respective developer units contain discretely colored toner particles corresponding to the complement of the spectral region of the wavelength of light transmitted through filter 20. For example, a green filtered electrostatic latent image is rendered visible by depositing green absorbing magenta toner particles thereon. Similarly, blue and red latent images are developed with the yellow and cyan toner particles, respectively.

After the single color electrostatic latent image recorded on photoconductive surface 12 is developed with toner particles complementary in color thereto, drum 10 is rotated to transfer station D. At transfer station D, the toner powder image is electrostatically attracted to photoconductive surface 12 and is transferred to a sheet of final support material 34. Final support material 34 may be plain paper or, in the formation of transparencies, a sheet of thermoplastic transparent material. A transfer roll, shown generally at 36, recirculates support material 34 in the direction of arrow 38. Transfer roll 36 is electrically biased to a potential of sufficient magnitude and polarity to electrostatically attract toner particles from photoconductive surface 12 to sheet 34. U.S. Pat. No. 3,612,677 issued to Langdon et al. in 1972 describes a suitable electrically biased transfer roll. Transfer roll 36 is arranged to rotate in synchronism with photoconductive surface 12. By this it is meant that transfer roll 36 and drum 10 rotate at substantially the same angular velocity and have substantially the same outer diameter. Inasmuch as support material 34 is secured releasably to transfer roll 36 and moves in recirculating path therewith, successive toner powder images may be transferred thereto in superimposed registration with one another. This permits a multi-layered toner powder image to be formed on the sheet of support material 34.

With continued reference to FIG. 1, the path for advancing support material 34 to transfer roll 36 will be briefly described hereinafter. Support material 34 is disposed as a stack 40 on tray 42. Feed roll 44 is operatively associated with retard roll 46 to separate and advance successive uppermost sheets from stack 40. The advancing sheets then move into a paper chute 48 which directs them into the nip of register rolls 50. Next, gripper fingers 52, mounted on transfer roll 36, releasably secure thereto each sheet for movement therewith in a recirculating path.

Continuing now with the printing process, after all of the discretely colored toner powder images have been transferred to support material 34, gripper fingers 52 space support material 34 from transfer roll 36. This permits stripper bar 54 to be interposed therebetween so as to separate support material 34 is then positioned on endless belt conveyor 56 which advances it to fixing station E.

At fixing station E, a suitable fuser, indicated generally at 58, permanently affixes the transferred toner powder image to support material 34. A typical fuser is described in U.S. Pat. No. 3,498,592 issued to Moser et al. in 1970. After the multi-layered toner powder image is fused, support material 34 is advanced by endless belt conveyors 60 and 62 to catch tray 64. At catch tray 64, the machine operator may remove the final color copy from the printing machine.

The final processing station in the direction of rotation of drum 10 is cleaning station F. Although a preponderance of the toner particles are transferred to support material 34, invariably some residual toner paarticles remain on photoconductive surface 12. Preferably, a brush 66 is positioned in contact with photoconductive surface 12 at cleaning station F to remove the residual toner particles from photoconductive surface 12. One type of suitable brush cleaning device is described in U.S. Pat. No. 3,590,412 issued to Gerbasi in 1971. Prior to removing the residual toner particles with brush 66, a corona generating device (not shown) neutralizes the electrostatic charge remaining on the toner particles and that of photoconductive surface 12. This more readily enables brush 66 to remove the residual toner particles from photoconductive surface 12.

It is believed that the foregoing description is sufficient for purposes of the present application to illustrate the general operation of a color electrophotographic printing machine embodying therein an optical system which may be aligned by the apparatus and method of the present invention.

The optical system disclosed in FIG. 1 includes a pair of scan lamps 26. Each scan lamp 26 is an elongated tubular member having the exterior circumferential surface thereof opaque with a clear region extending over a 45° arc therein. The clear region extends substantially the entire length of the tubularly configured lamp. Scan lamp 26 operates at about 30 watts, 37 volts and 1.5 amps. RMS. The spectral energy distribution of the red output is about 44 microwatts per centimeter$^2$, the green output about 82 microwatts per centimeter$^2$ and the blue output about 25 microwatts per centimeter$^2$. The lamp includes three phosphors having a color balance such that the blue/green ratio is 0.3 and the red/green ratio is 0.53.

Figure 2:
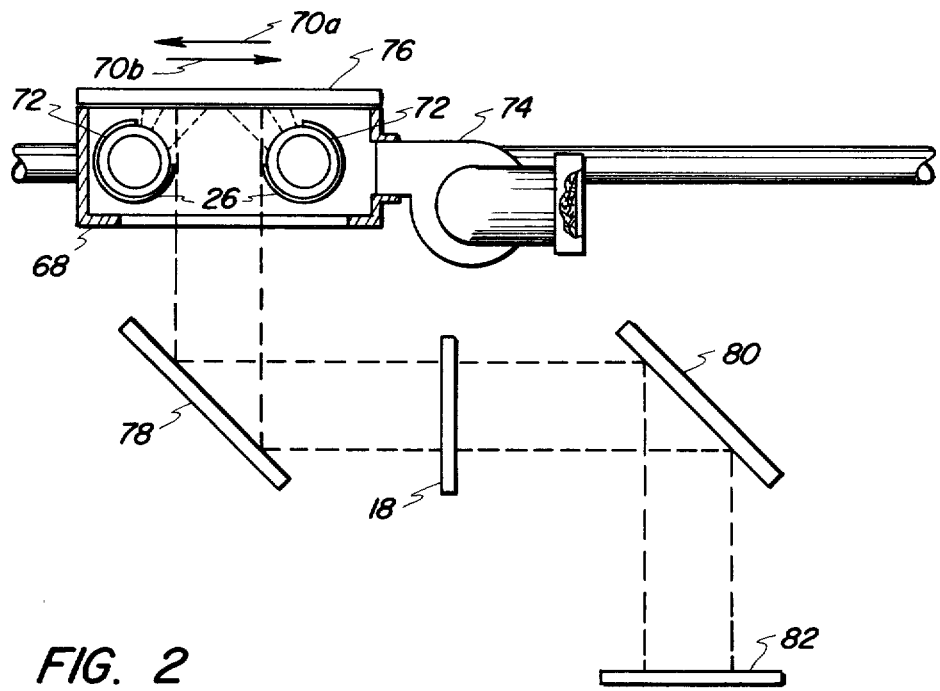
FIG. 2 is an elevational view of the system employed to align the FIG. 1 printing machine optical system.

Referring now to the specific subject matter of the present invention, FIG. 2 depicts schematically the alignment mode of the optical system illustrated in the FIG. 1 printing machine. As shown in FIG. 2, a lamp carriage 68 supports rotatably the pair of scan lamps 26 therein. Lamp carriage 68 is arranged to traverse platen 24 in the direction of arrow 70 to illuminate incremental widths of original document 22. Sleeve heater 72 is arranged to furnish energy to scan lamps 26 so as to maintain the temperature thereof substantially constant. Blower 74 is secured to lamp carriage 68 and directs a flow of cooling air to lamps 26 so as to reduce the temperature thereof. In this way, heater 72 may raise the temperature of lamp 26 when it is beneath a predetermined temperature and the cooling air flow from blower 74 may reduce the temperature of lamp 26 when it exceeds a predetermined temperature. The scan lamp thermal control system is described, in detail, in U.S. Pat. No. 3,779,640 issued to Kidd in 1973, the disclosure of which is hereby incorporated into the present application.

Turning once again to FIG. 2, an alignment member 76 is disposed upon lamp carriage 68. The light rays reflected from alignment member 76 are transmitted to mirror 78 which in turn reflects these light rays through lens 18. This creates a sample light image. The sample light image is then reflected from mirror 80 onto indicating means 82. Indicating means 82 has indicia thereon enabling the operator to compare the width, movement and angular orientation of the sample light image relative to a centrally located calibration mark. If the sample light image projected onto indicating means 82 moves substantially the same distance on either side of the calibration mark disposed thereon, is of an equal width at the furthest extremes of movement, and is parallel thereto, the optical system is in alignment. However, if the distance moved, the width, or angular orientation of the sample light image is incorrect, the optical system is misaligned. If such is the case, lamp carriage 68 is moved so as to align the system. Thereafter, a second sample light image is projected onto indicating means 82 so as to determine whether the adjustment has now aligned the optical system. It should be noted that the frame or lamp carriage 68 supporting scan lamps 26 is driven by a cable drive system connected to a suitable motor. Lamp carriage 68 moves in the forward direction, as shown by arrow 70a so as to incrementally illuminate the original document, and in the return direction, as shown by arrow 70b to its initial position. However, in the calibration mode, alignment member 76 moves with lamp carriage 68 and the same sample light image is continuously projected onto indicating means 82. Thus, the movable optical system of the electrophotographic machine is aligned by the alignment member and indicating means of the present invention. In summary, the alignment member is disposed upon the frame or lamp carriage and the scan lamps transmit light rays thereto. The light rays are reflected from mirror 78 through lens 18 to create a narrow sample light image. The narrow sample light image is projected by mirror 80 onto indicating means 82 so as to be compared during the movement thereof with a calibration mark thereon. As the lamp carriage moves in the direction of arrow 70a, the narrow sample light image projected onto indicating means 82 is viewed by the machine operator to determine whether the optical system is in alignment. Thereafter, the machine operator adjusts scan lamps 26 to align the optical system. Once the optical system has been aligned, the foregoing procedure is repeated with a second sample light image to insure that the alignment has proven satisfactory.

Figure 3:
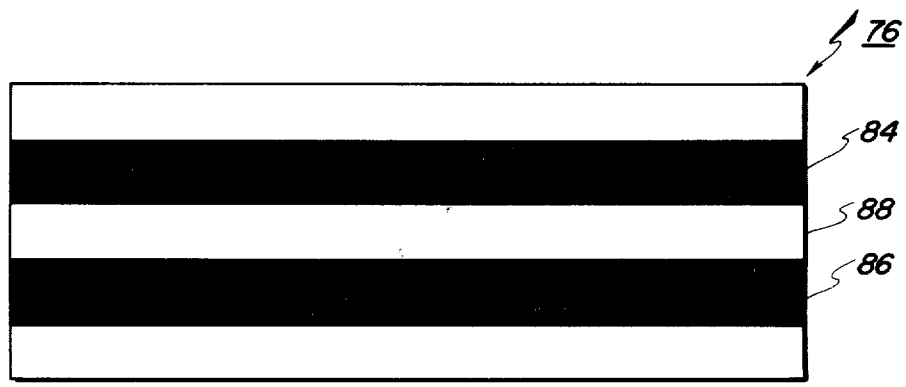
FIG. 3 is a plan view of the alignment member employed in the alignment of the optical system.

Referring now to FIG. 3, alignment member 76 is a sheet member having a pair of light absorbing regions 84 and 86 with a light reflecting region 88 interposed therebetween. Light absorbing regions 84 and 86 are preferably a black or a darkened region adapted to absorb light rather than reflecting light therefrom. Contrawise, light reflecting region 88 is white or a yellow region adapted to reflect light rays therefrom. Thus, the light rays reflected from region 88 form the sample light image heretofore discussed. The light rays reflected from region 88 are employed to form a narrow band sample light image the width, movement, and orientation of which on indicating means 82 is indicative of the alignment of the optical system. The sheet member employed to form alignment member 76 may be made from a suitable plastic or cardboard material.

Figure 4:
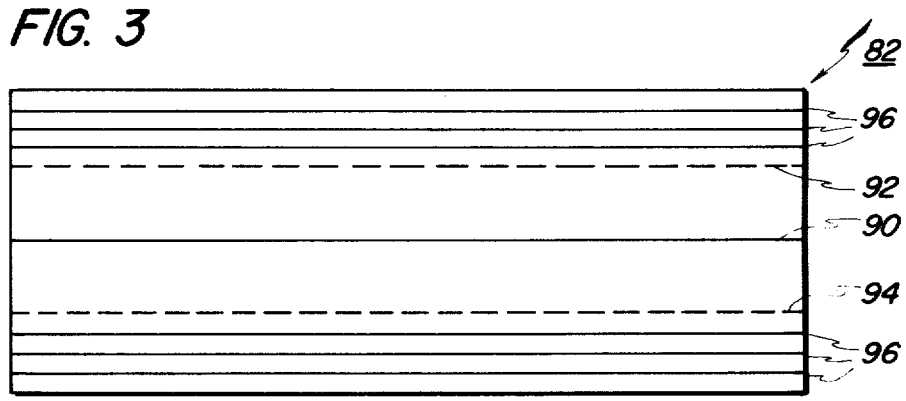
FIG. 4 is a plan view of the indicator employed in the alignment of the optical system.

Turning now to FIG. 4, there is shown indicating means 82. As depicted therein, indicating means 82 is a sheet member, preferably made from a plastic or cardboard material. Indicating means 82 includes a calibration mark, i.e., a heavy darkened line extending along the longitudinal axis thereof. The calibration mark is depicted by the reference numeral 90. A pair of dotted lines 92 and 94, respectively are equally spaced about calibration mark 90 and are employed to determine whether the movement of the sample light image is equal on both sides of calibration mark 90. In addition, the light image should be substantially parallel to dotted lines 92 and 94. Finally, a plurality of equally spaced indicating lines 96 are disposed on indicating means 82 and extend parallel to calibration mark 90 in a longitudinal direction. Indicating lines 96 are employed as a gauge to determine the movement, width, and orientation of the sample light image about calibration mark 90.

In recapitulation, it is evident that the alignment member employed in the electrophotographic printing machine of FIG. 1 is adapted to reflect a narrow band of light rays therefrom. These light rays pass through the lens so as to form a narrow band light image. This light image is then projected onto an indicator for evaluating the width, orientation and movement thereof. The foregoing criteria are employed to determine the alignment of the optical system. Thereafter, the lamp carriage is adjusted to align the optical system. When the optical system is suitably aligned, the copy produced by the electrophotographic printing machine has the requisite color balance, image clarity and definition.

It is, therefore, evident that there has been provided, in accordance with the present invention, an apparatus and method of use associated therewith for aligning an optical system employed in an electrophotographic printing machine that fully satisfies the objects, aims and advantages set forth above. While this invention has been described in conjunction with specific embodiments and methods of use therefor, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An electrophotographic printing machine, including:

a movable frame member;

a light source mounted on said frame member;

lens means arranged to create a light image from the light rays transmitted thereto;

an alignment member in a light receiving relationship with the light rays transmitted from said light source, said alignment member being adapted to reflect light rays therefrom to said lens means for creating a sample light image therefrom; and means for indicating the position of the sample light image so as to determine alignment of the optical system, said indicating means being in a light receiving relationship with the sample light image transmitted through said lens means.

2. A printing machine as recited in claim 1, wherein said light source includes at least one substantially elongated tubular member having a substantially opaque region extending over a portion of the exterior circumferential surface thereof from about one end portion of said tubular member to about the other end region thereof, and a substantially transparent region extending over the remaining portion of the exterior circumferential surface of said tubular member.

3. A printing machine as recited in claim 1, further including means for moving said frame member.

4. A printing machine as recited in claim 3, wherein said alignment member includes a first sheet member having a pair of longitudinally extending light absorbing regions with a light reflecting region interposed therebetween, said sheet member being mounted on said frame member.

5. A printing machine as recited in claim 4, wherein said indicating means includes a second sheet member having a calibration mark thereon, said second sheet member being positioned to receive the sample light image formed from the light rays reflected from the light reflecting region of said first sheet member and transmitted through said lens means.

* * * * *